April 12, 1960 F. MASSA 2,932,776

DIRECT RECORDING OSCILLOGRAPH

Filed Feb. 16, 1956 3 Sheets-Sheet 1

Inventor
Frank Massa
By Louis Bernat.
Attorney

April 12, 1960 F. MASSA 2,932,776

DIRECT RECORDING OSCILLOGRAPH

Filed Feb. 16, 1956 3 Sheets-Sheet 2

Inventor
Frank Massa
By Louis Bernat.
attorney

April 12, 1960 F. MASSA 2,932,776

DIRECT RECORDING OSCILLOGRAPH

Filed Feb. 16, 1956

3 Sheets-Sheet 3

Inventor
Frank Massa
By Louis Bernat.
Attorney

United States Patent Office
2,932,776
Patented Apr. 12, 1960

2,932,776

DIRECT RECORDING OSCILLOGRAPH

Frank Massa, Cohasset, Mass., assignor to Cohu Electronics, Inc., San Diego, Calif., a corporation of Delaware Application February 16, 1956, Serial No. 565,820
16 Claims. (Cl. 317—173)

This invention relates generally to an oscillograph and more particularly to a high speed electrodynamic direct recording pen or stylus type oscillograph.

Electrodynamic oscillographs of the type to which this invention relates are adapted to record upon any suitable record member the instantaneous values of an electrical signal such as may be obtained for example from measurements of certain physiological variables in the human body or in a large variety of mechanical and electrical structures. Manifestly it is desirable that such oscillographs be capable of providing a distortion-free record having an amplitude sufficient to enable ready calibration and interpretation. It further is desirable that such oscillographs be adapted to record with a substantially flat response electrical signals having frequencies extending over relatively wide ranges.

There have been many attempts in the prior art to provide high speed direct recording oscillographs having the above characteristics. One electrodynamic structure which has been utilized commercially employs the well-known D'Arsonval movement in which a rectangular coil of wire is pivotally mounted between a pair of magnetic pole pieces so as to rotate about a vertical axis in the field created by the pole pieces. The two vertical sides of the rectangular coil are located near the center of a radial magnetic field such that the forces generated therein, when electrical signals are applied to the coil, cause angular displacement of the coil about the vertical axis. Generally, a restoring spring is associated with the coil for controlling the amount of deflection resulting for a given current flowing through the coil. A pen is rigidly connected to the coil such that the oscillations of the latter are transferred to direct oscillograph recordings on a moving chart positioned in operative relation to the pen.

It has been a practice in prior art electrodynamic oscillographs of the above-described type to adjust the stiffness of the restoring spring so that the effective mass of the oscillating coil and pen system resonates in the general vicinity of 20 to 60 cycles per second. Thus the general frequency response characteristic of such oscillographs shows an approximately uniform amplitude of vibration of the pen tip per unit current for frequencies below the resonant frequencies of the system; a sharp increase in amplitude at the resonant frequencies due to the lower mechanical impedance of the vibrating system; and a falling off of the amplitude of vibration for constant current as the frequencies increase above resonance. Therefore, it is clear that the large increase in oscillating amplitudes in the vicinity of resonance in these prior art systems gives rise to considerable distortion in the reproduced signal.

A further disadvantage in the use of the D'Arsonval type movement is that the two horizontal legs of the rectangular coil necessarily remain outside the air gap between the pole pieces. Not only does this add inactive series resistance to the active portion of the coil but also adds inert mass to the vibrating system which, in turn, requires relatively heavy magnets to provide the proportionately higher flux needed therebecause.

A still further disadvantage of D'Arsonval type movement is that the magnetic circuit is relatively inefficient because the area of the gap which has to be supplied with flux must include the full angular excursion of the pivot coil form. Thus only a small fraction of the air gap area effectively is employed by the coil at any particular coil position.

Still another disadvantage of these prior art systems is that the direct attachment of the pen to the oscillating coil produces curvilinear distortion in the recordings. As a result, it is necessary to print the recording charts with curvilinear coordinates. In addition to producing serious distortions in the true picture of a transient wave front, the curvilinear coordinates present a troublesome problem in applications where multiple channels are used on wide charts, in which case the time intervals between successive events recorded by the various channels are not readable by a direct system of rectilinear coordinates in which parallel vertical lines on the chart correlate the various time intervals between successive channels.

It is a general object of this invention to provide an improved high speed electrodynamic direct recording oscillograph.

It is another object of this invention to provide a high speed electrodynamic oscillograph of efficient, lightweight and compact design.

It is still another object of this invention to improve the uniformity of response of a high speed electrodynamic oscillograph over a frequency range from D.C. in excess of 150 cycles per second.

It is a further object of this invention to minimize the impedance variation in an electrodynamic vibrating system in the vicinity of resonance such that a transient response of the system is not distorted by such phenomena as ringing and overshoot.

It is a still further object of this invention to provide an electrodynamic vibrating system having improved means for maintaining a desired spacing between the coil and the magnetic pole pieces.

It is a still further object of this invention to provide a high speed electrodynamic oscillograph in which curvilinear distortion due to angular displacement of the coil is eliminated.

It is a still further object of this invention to provide a direct recording electrodynamic oscillograph with means for producing a straight line rectilinear drive for the recording pen or stylus.

It is a still further object of this invention to provide an electro-mechanical transducer with improved means for translating a curvilinear movement into a rectilinear movement.

An additional object of this invention is to provide new and improved mechanical means for damping an electrodynamic transducer.

Still another object of this invention is to provide improved ink supply means for the pen of a direct recording oscillograph.

These and other objects are realized in a specific illustrative embodiment of this invention in which a cylindrical coil-bearing element of an electro-mechanical transducer is adapted for translatory movement with respect to a cylindrical magnetic element in accordance with characteristics of electrical signals applied to the coil. In accordance with a feature of this invention a plurality of low friction guides or spacers is disposed intermediate the cylindrical coil-bearing element and the cylindrical magnetic element for establishing an air space of predetermined magnitude therebetween.

Mechanical damping for minimizing impedance variations in the system is provided in accordance with a feature of this invention in several distinct ways which advantageously may be used singly or in combination. One end of the cylindrical coil-bearing element is sealed so as to create an air trap and thereby provide acoustical damping by a resistive film of air in the air space established by the spacers. Alternatively a small bore tube means is inserted in the sealed end of the cylindrical coil-bearing element. Inasmuch as the damping provided by the tube means is dependent upon its length and diameter, the damping may be varied by selectively changing these dimensions. Still further, damping may be provided by a relief tube extending through the magnetic pole piece into the cylindrical coil-bearing element and thereby communicating the trapped air in the end of the latter to the external atmosphere.

In accordance wih another feature of this invention the translatory motion of the coil-bearing element is converted to equivalent rotational displacement by a shaft member connected to the coil bearing element adapted for rotation about its vertical axis only. The shaft member is connected through a linkage to the recording pen or stylus of the oscillograph. In accordance with a further feature of this invention, this linkage is adapted to translate the rotational displacement of the shaft member into a straight line rectilinear drive for the pen thereby eliminating the above-discussed curvilinear distortion in prior art oscillographs.

It is an additional feature of this invention that this linkage may be adapted for utilization with oscillographs of the D'Arsonval movement type and may be connected between the coil member and the pen therein for providing a rectilinear drive for the latter in response to the curvilinear movement of the former.

Further in accordance with the instant invention, the pen or stylus may be calibrated and set to a no-drive condition by mechanically adjusting the angular position of a cooperating shaft. Additionally, a spring member is associated with the shaft, wherein the magnitude of compliance of the spring member determines the displacement of the pen or stylus proportional to the amount of current through the coil.

A still further feature of this invention is an inkwell member having a flexible tubing associated therewith for supplying ink to the pen or stylus. Advantageously, means are provided whereby the inkwell member may be initially primed merely by exerting finger pressure thereon.

The above and other various features of novelty which characterize the invention are pointed out with particularity with the claims annexed to and forming a part of the specification. For a better understanding of the invention, however, its advantages and specific objects attained with its use, reference is had to the accompanying drawings and descriptive matter in which is described and shown an illustrative embodiment of the invention.

Figures 1, 7, 8, 9:
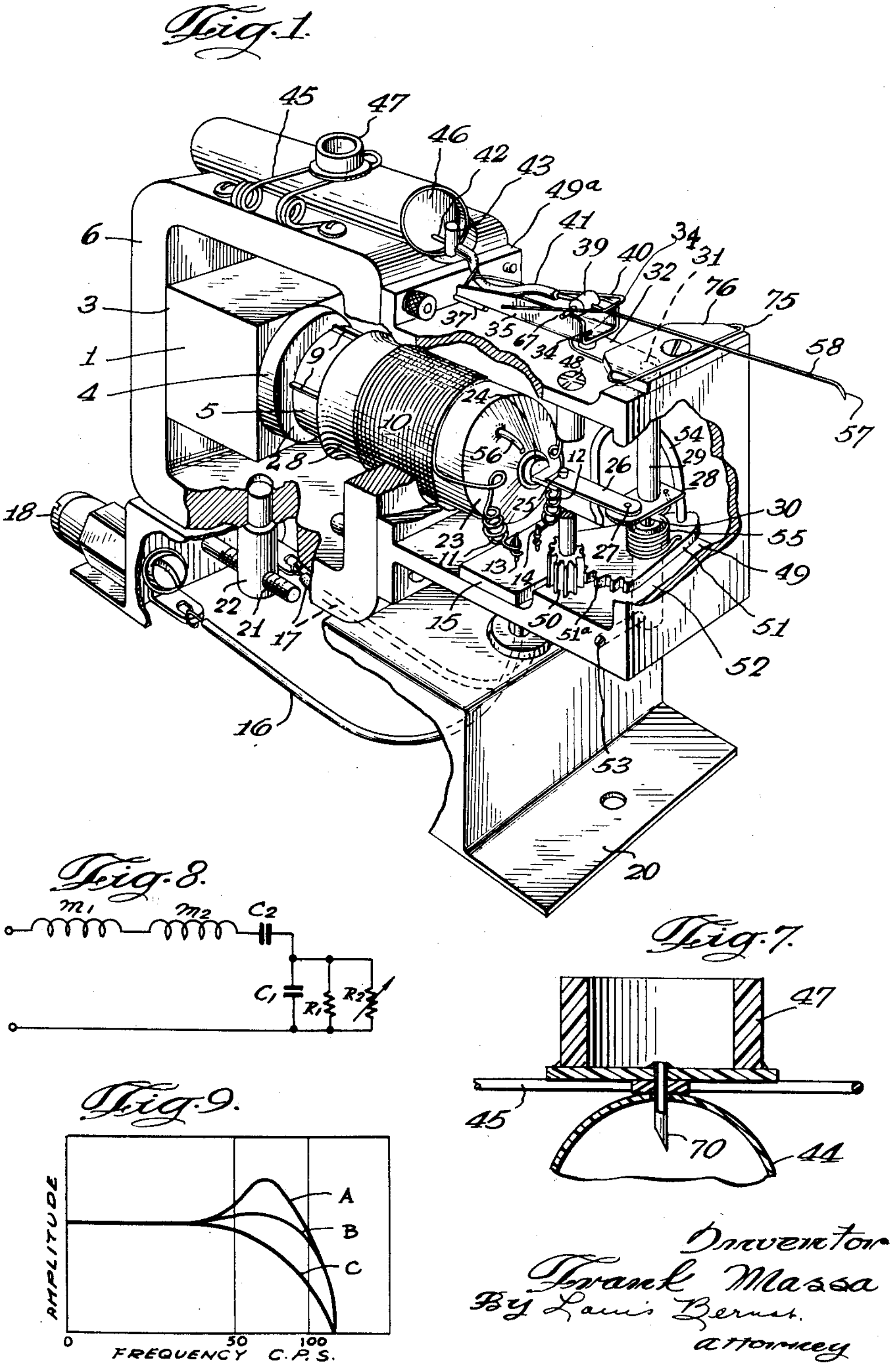
Figure 1 is a partially broken-away pictorial view of an electrodynamic transducer and associated recording and damping apparatus suitable for use with the direct recording oscillograph of the present invention.
Figure 7 is a view taken along lines 7—7 of Figure 3.
Figure 8 is a schematic diagram of the equivalent electrical circuit of the vibrating system shown in Figure 2.
Figure 9 is a chart showing the frequency response of the equivalent circuit of Figure 2 and the corresponding vibrating system of Figure 2 as a function of the magnitude of the acoustical damping provided in the system.
Figure 3:
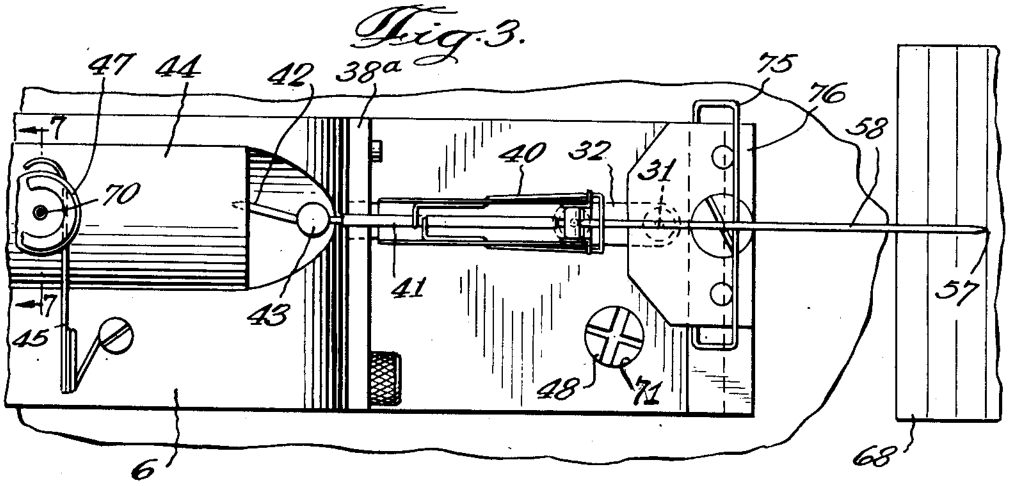
Figure 3 is a plan view of the mechanism of Figure 2.
Figure 2:
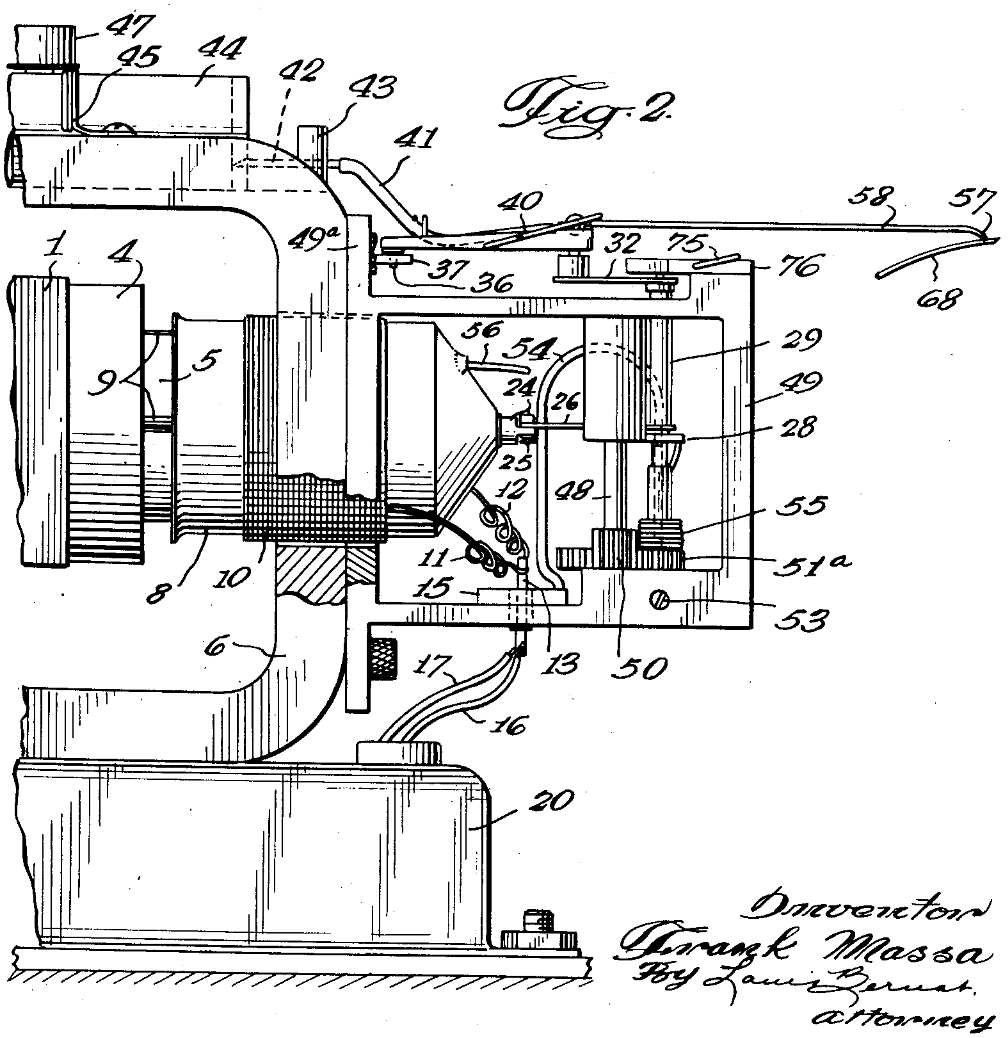
Figure 2 is an elevational view of the electro-dynamic system and linkage arrangement for driving the pen or stylus.

Referring now to the drawings, namely Figures 1 and 2, the electrodynamic vibrating system of the instant invention comprises a permanent magnet 1, having at one end thereof a pole 2 and at the other end thereof an opposite pole 3. A soft iron adapter plate 4 and a soft iron pole piece 5 are attached to magnet 1 at the pole 2 and advantageously may be secured thereto by any suitable means, such as by cement or solder. A soft iron yoke 6 is attached to the opposite pole 3 of the magnet 1 and has a circular opening in one face thereof through which pole piece 5 passes, to establish an annular air gap 7.

A cylindrical coil form 8 is positioned in operative relation with the pole piece 5 and is adapted for translatory movement with respect thereto. To maintain a desired spacing between pole piece 5 and coil form 8 and to enhance the sliding relation of the former with the latter, advantageously there is provided a number of guide or spacer elements 9 disposed intermediate the pole piece 5 and coil form 8. In accordance with an aspect of this invention, spacers 9 may comprise a number of elongated segments or strips of a relative frictionless deformable plastic material, such as tetrafluoroethylene, monochlorotrifluoroethylene and polyethylene; although this invention is not limited to any particular means for disposing the spacer elements or to any particular materials therefor. In accordance with the instant illustrative embodiment, spacers 9 are rigidly secured to pole piece 5, as for example by placing the spacers into longitudinal slots machined in the cylindrical surface of pole piece 5. The inner diameter of the coil form 8 may be chosen to achieve precise clearance of the surface of spacers 9, as clearly shown in Figure 5 of the drawing.

A coil of insulated wire 10 is wound around the central periphery of coil form 8 and the coil leads 11 and 12 therefrom are looped soldered to terminal pins 13 and 14, respectively, which are mounted in an insulating strip 15. Insulated leads 16 and 17 establish connections between terminals 13 and 14 and external terminals 18 and 19, respectively.

A rigid base member 20 is fitted with a micrometer adjusting screw 21 which is threaded into the bottom of the base pin 22. The latter, in turn, is fastened into the yoke member 6 of the magnetic structure. It is manifest from the drawing that the micrometer screw arrangement 21 and 22 permits fine adjustment of the final position of the oscillograph structure relative to the position of base member 20 and thus may be used to set the position of the pen or stylus with respect to the recording chart.

In accordance with an aspect of this invention, one end of coil form 8 is closed by a seal 23. Advantageously, an end seal 23 may have a tube member 56 extending therethrough for purposes explained in detail below. The end seal 23 carries a flange pin 24 which is connected by a pivot 25 to one end of a link member 26. The other end of link member 26 is connected by a pivot 27 to a cross member 28 which is, in turn, securely fastened to an axis shaft 29. The axis shaft 29 has at one end thereof a bearing 30 and at the other end thereof a bearing 31 and is mounted so as to be freely rotatable in these bearings. A second cross member 32 is secured to the axis shaft 29 at the upper end thereof at bearing 31. The free end of cross member 32 carries a pivot shaft 33, whose free end is adapted to turn freely in a bearing 34 which is affixed at one end of the linkage member 35. The opposite end of the linkage member 35 carries a pin pivot 36 which is free to slide between a pair of spaced fixed parallel guide pins 37 and 38, which are affixed to a housing flange 49a.

By following the developed displacement from the coil form 8 through the mechanical system of various associated linkage elements, namely—26, 28, 29, 32, 34, and 35, it can be seen how the translatory movement of coil form 8, with respect to magnetic pole piece 5 in response to electrical signals applied to coil 10, results in substantially a straight line rectilinear movement of the stylus or pen arrangement 57 connected to the linkage member 35.

Figures 5, 6, 10:
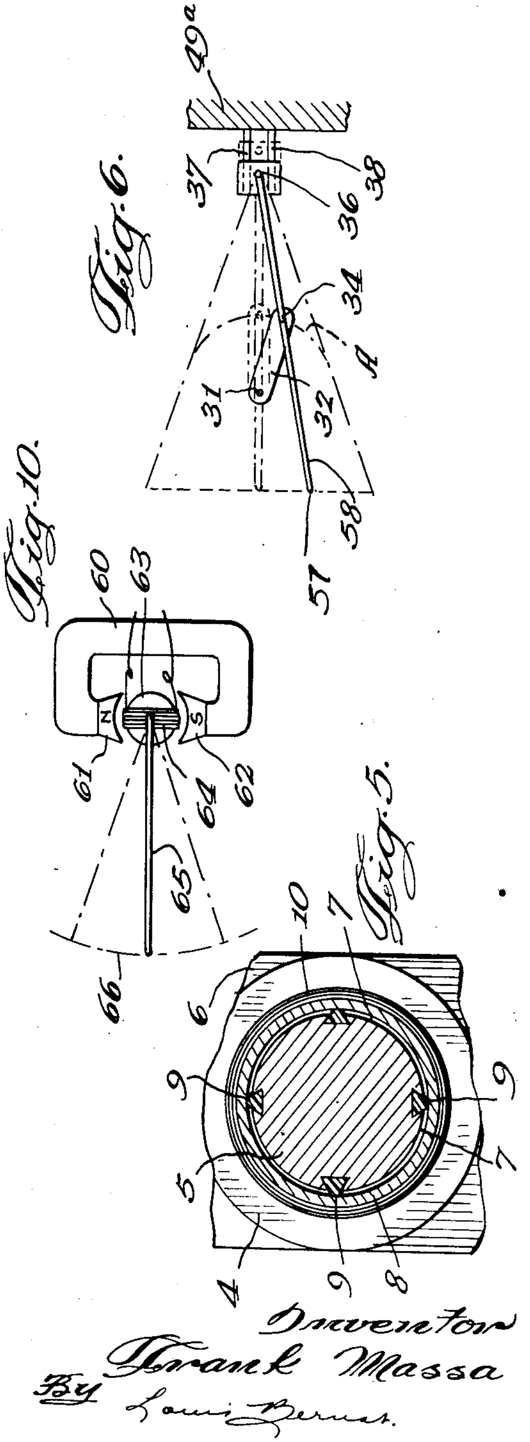
Figure 5 is an enlarged view taken along lines 5—5 of Figure 4.
Figure 6 illustrates the linkage detail for translating curvilinear motion into rectilinear motion.
Figure 10 illustrates the curvilinear motion which results at the pen tip in a conventional D'Arsonval type of prior art oscillograph.

The manner in which the curvilinear distortion, which would be present in the motion of the tip of pen 57, if the pen were attached directly to rotate about the axis of shaft 29, is eliminated by the use of cross member 32 with its offset pivot shaft 34 is shown more clearly in Figures 6 and 10 of the drawing.

Figure 10 is an illustrative view of an electrodynamic galvanometer operating on the conventional D'Arsonval principle as employed in the oscillographs of the prior art. A magnet 60, having opposite poles 61 and 62, together with cylindrical core 63 serve to establish an air gap within which is suspended a rectangular coil 64. A pen 65 is attached to rectangular coil 64 and the displacements of the tip of pen 65 describe an arc 66 when alternating current is applied to the windings of coil 64. Manifestly, the arc 66 generated by the movement of pen 65 produces curvilinear distortion which, as hitherto-fore pointed out, must be compensated for by the use of curvilinear coordinates on the recording chart.

Figure 6 of the drawing illustrates schematically that portion of the linkage mechanism which corrects the curvilinear distortion produced in the D'Arsonval type of movement shown in Figure 10. The cross member 32 is shown dotted for the position corresponding to the central position of pen 57. For a given translatory displacement of coil form 8, the corresponding angular rotation of shaft 29 will cause cross member 32 to move to the full line position shown in Figure 6. Since the axis of the pivot 31 remains fixed, pivot 34 is forced to prescribe a curve A, which in turn directs pivot 36, mounted between parallel guide member 37 and 38, to move laterally and thereby compensate for the curvilinear motion. The pivot pin 36 is adapted to be free to execute translatory displacement between parallel guide members 37 and 38 at right angles to the straigtht line rectilinear displacements executed by pen 57 in addition to rotational movement about its own vertical exis. By proper choice of the length of the cross member 32 and the location of the pivot pin 36, in relation to the length of the segment pen arm 58, it is empirically feasible to substantially transform the curvilinear motion of the pen movement in Figure 10 to the substantial straight line motion of the tip of the pen 57, as illustrated in Figure 6. Fundamentally, the arm or cross member 32, describes an ellipse in the family of curves and where the angle is small, that segment or sector of the ellipse approximates a segment or sector of a circle, and consequently, under these unique conditions for small angles, that segment or sector approximates a straight line.

In accordance with further features of this invention, the rearward portion of pen tip 57 is connected to one end of a hollow pen tube or arm 58 which passes through the trunnion or pivot shaft 39. The free ends of shaft member 39 are adapted to drop into swivel notches 67 provided in the linkage member 35 so that the tip of pen 57 is free to move about the axis of shaft member 39. A spring 40 is anchored to the linkage member 35 and is adapted to press downward on the tubular member pen arm 58 so that the tip of pen 57 will bear down with predetermined pressure against the recording surface 68 over which it will be made to ride. Advantageously, a lifting wire 75 may be pivotally mounted in a support shelf 76 attached to housing 49 for enabling the pen arm 58 to be held up above the recording surface 68 when desired.

A length of flexible tubing 41 is fastened to the free end of the pen tubing or arm 58 and serves to connect the pen and tubing to a needlelike tubular member 42 which is held in fixed position relative to the yoke member 6 by means of a connecting insertion tube 43. An ink cartridge 44 which advantageously comprises a casing of relatively soft material, such as a polyethylene plastic structure, is inserted under and held by a spring clamp 45. The flat frontal portion 46 of link cartridge 44 is pierced by needle-like hollow tube member 42. In accordance with a feature of this invention, a resilient annular member 47, which advantageously may be of foam rubber or the like, is cemented to the spring clamp 45 and serves as a priming pump for forcing the ink through the hollow tube 58 to the pen 57 for initial priming purposes. As shown more clearly in Figure 7, before the resilient member 47 is used as a priming pump, the wall of the ink cartridge 44 is pierced by a needle-like hollow member 70 positioned in a support 45 at the center of resilient member 47. The pumping action then may be initiated simply by pressing a finger down upon resilient member 47 and thereby causing the trapped air therewithin to force the ink in the cartridge through hollow tube 58 to the tip of pen 57.

Referring to the mechanism for zero positioning the pen movement, a shaft member 48 is slotted at one end and passes through an opening in the top of the linkage housing 49. The slotted end of shaft member 48 is pressed fit in the opening 71 so as to prevent free motion of shaft member 48 in the opening. The opposite end of shaft member 48 is provided with a pinion 50 which engages a floating cam 51 adapted to be freely rotatable over the supporting pin 52. Advantageously, a set screw 53 serves to lock supporting pin 52 to the linkage housing 49. A resilient spring member 54 is affixed so as to exert a constant force between the housing 49 and floating cam 52, the purposes of spring member 54 being to eliminate any back-lash between the pinion 50 and the mating teeth 51a on the floating cam 51.

A supplemental resilient member 55, which advantageously may be a helical spring, is positioned over supporting pin 52 and has one end thereof connected to the cross member 28 and the other end thereof connected to the floating cam 52. Therefore, it may be seen that by rotating shaft member 48, by any suitable means such as a screw-driver inserted into the slotted free end, the zero position of the pen 57 may be adjusted as desired. The magnitude of the compliance of resilient member 55 controls the displacement of pen 57 per unit of signal current passing through coil member 10. In addition, the compliance of resilient member 55 in combination with the mass of the coil member 10 and the effective mass of the linkage system and stylus structure determines the resonance frequency of the vibrating system.

Figure 4:
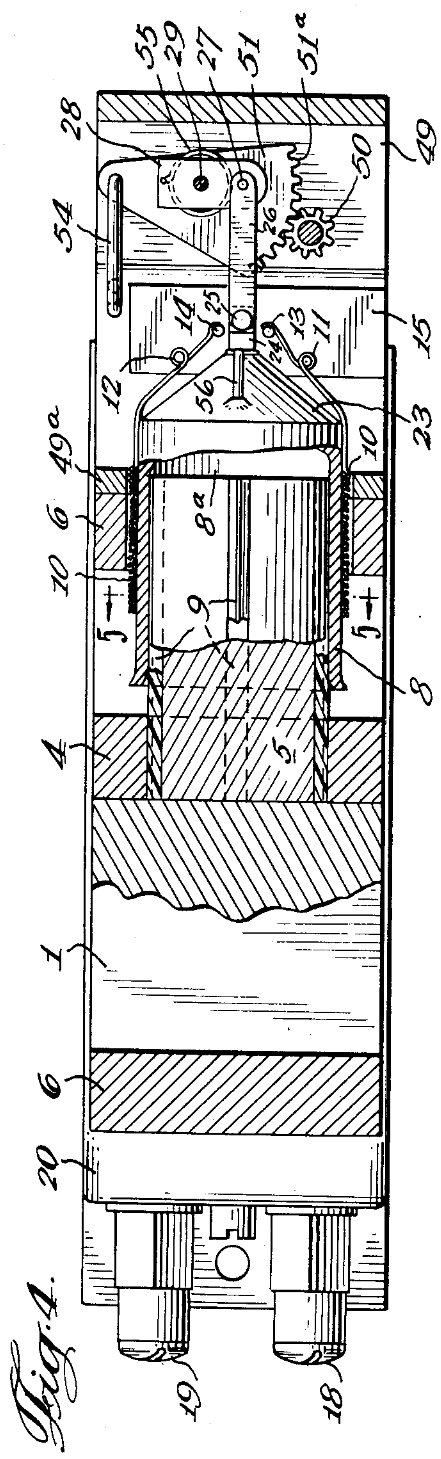
Figure 4 is a partially broken-away plan view of the device of Figure 1 with the inkwell and recording apparatus omitted.

The equivalent electrical circuit shown in Figure 8 of the drawing serves to illustrate the effect of the various parameters in determining the frequency response characteristic of the vibrating system. The mass of the signal coil assembly comprises coil form 8 and coil means 10 as illustrated by the inductance of $m_1$. The effective mass of the linkage system and stylus assembly corresponds to the inductance $m_2$. The compliance of resilient member 55 is shown by the condenser $C_2$ in the equivalent circuit. The trapped volume of air in the reentrant cavity 8a between the closed end of the coil form 8 and the pole piece 5 is illustrated by the condenser $C_1$. An alternative method for varying the volume of air in the closed end of the coil form 8 is to employ a variable orifice in the rearward end of the pole piece 5, thereby changing the acoustical damping of the vibrating system. The thin film of air provided by spacers 9 between the inner surface of coil form 8 and the outer surface of pole piece 5 gives rise to an acoustic resistance which is represented by $R_1$ in the equivalent circuit. The small bore tube means 56, shown as an alternative damping means in Figures 1, 2 and 4 of the drawing communicates the trapped air volume $C_1$ to the outer atmosphere and is represented by the resistance $R_2$ in the equivalent circuit.

The magnitude of resistance $R_2$ decreases as the length of tube means 56 is reduced and increases as the cross-sectional area of tube means 56 is reduced. Therefore, the resistance $R_2$ is shown as a variable resistance in the equivalent circuit which appears in shunt with the resistance representing the film of air intermediate the pole piece 5 and the coil form 8. Manifestly, the variable shunt resistance $R_2$ may be adjusted either by decreasing the length of tube means 56 or reducing its cross-sectional area depending on whether a decrease or an increase in the magnitude of $R_2$ is desired for final precision adjustment of the mechanical damping of the system. It also will be appreciated that the magnitude of the impedance of condenser $C_1$ should be kept as high as possible in order to prevent shunt effects on the magnitude of $R_1$. This, in turn, requires that the volume represented by the condenser $C_1$ be held to a minimum value.

The frequency response characteristics of the vibrating system for various magnitudes of damping resistance $R_1$ are shown in Figure 9. The curves A, B, and C show the amplitude of pen tip excursion for constant current in the coil means 10 over a frequency range from D.C. to approximately 100 cycles per second. Curve A illustrates the response realized when the clearance between the inner diameter of coil form 8 and the diameter of pole piece 5 is larger than optimum, a condition which results in the magnitude of $R_1$ being somewhat lower than required for optimum damping. Curve C shows the effect in the response characteristic of the system when the air space between the coil form and pole piece is smaller than optimum, a condition which results in the magnitude of the resistance $R_1$ being higher than that required for optimum damping. Curve B illustrates the response curve obtained when the air space between the coil form and pole piece, and therefore the corresponding magnitude of $R_1$, is approximately optimum. Thus it can be seen that as illustrated by curve B, a vibrating system may be adjusted for substantially flat response over the desired frequency range thereby largely eliminating the heretofore discussed difficulties which were encountered with prior art systems at their resonant frequencies.

It should be noted that in the above discussion of response curves A, B, C, it was assumed that the shunt resistance $R_2$ was infinite, which corresponds to the situation when the end of the tube means 56 is sealed. By referring to the equivalent electrical circuit shown in Figure 8, it will be clear how the resonant frequencies of the vibrating system may be varied by changing the compliance of the resilient member 55 which corresponds to changing the magnitude of condenser $C_2$.

Another embodiment in the pin writing system involves the use of a pressure release orifice in the tubular section of the pin arm. In a pen system which has a frequency range in excess of 100 cycles per second it is desirable that there be substantially uniform flow of the ink when the pen arm is subjected to a high degree of acceleration. Furthermore, it is necessary that this release orifice does not substantially alter the resonant frequency of the pen writing system.

It may be apparent that an electrical discharge system may be used by removing the ink reservoir system and utilizing the conventional electrical discharge method. In this system the pen system is electrically insulated and a discharge is thereby developed between the pen tip and the sensitized writing record.

While for the purpose of illustration the invention has been shown in a particular embodiment thereof, it will be understood that additional embodiments and modifications thereof may be devised without departing from the spirit and scope of the invention as defined by the appended claims.

I claim as my invention:

1. Means for converting electrical energy into mechanical energy comprising a magnetic member, a movable element in operative relation to said magnetic member, said movable element having a plurality of windings associated therewith adapted to be energized by electrical signals applied thereto, spacer means slidingly positioned intermediate said magnetic member and said movable element, and mechanical utilization means connected to said movable element and given translatory movement thereby in accordance with characteristics of said electrical signal.

2. Means for converting electrical energy into mechanical energy comprising a magnetic member, a movable element in operative relation to said magnetic member, said movable element having a plurality of windings associated therewith adapted to be energized by electrical signals applied thereto, a plurality of low friction spacer means positioned intermediate said magnetic member and said movable element adapted to enable the latter to slide over the former when said windings are energized, and mechanical utilization means connected to said movable element and given translatory movement thereby in accordance with characteristics of said electrical signal.

3. Means for converting electrical energy into mechanical energy comprising a cylindrical magnetic member, a cylindrical movable element in operative relation to said magnetic member, said cylindrical movable element having a plurality of windings associated therewith adapted to be energized by electrical signals applied thereto, spacer means slidingly positioned intermediate said magnetic member and said movable element, and mechanical utilization means connected to said movable element and given translatory movement thereby in accordance with characteristics of said electrical signal.

4. Means for converting electrical energy into mechanical energy comprising a cylindrical magnetic member, a cylindrical movable element in operative relation to said magnetic member, said movable element having a plurality of windings associated therewith adapted to be energized by electrical signals applied thereto, a plurality of low friction spacer means disposed around the circumference of said magnetic member for enabling vibratory movement of said movable element relative to said magnetic member upon energization of said windings, and mechanical utilization means connected to said movable element and given translatory movement thereby in accordance with characteristics of said electrical signals.

5. Means for converting electrical energy into mechanical energy comprising a magnetic member, a movable element in sliding relation to said magnetic member, said movable element having mechanical damping means operatively connected thereto, a plurality of windings associated with said movable element adapted to be energized by electrical signals applied thereto, spacer means positioned intermediate said magnetic member and said movable element, and mechanical utilization means connected to said movable element and given translatory movement thereby in accordance with characteristics of said electrical signal.

6. A transducer for converting electrical energy into mechanical energy comprising a magnetic member, a movable element in sliding relation to said magnetic member, said movable element having means for damping said transducer, a plurality of windings associated with said movable element adapted to be energized by electrical signals applied thereto, spacer means positioned intermediate said magnetic member and said movable element, said spacer means maintaining an air space of predetermined size therebetween, and mechanical utilization means connected to said movable element and given translatory movement thereby in accordance with characteristics of said electrical signal.

7. A transducer in accordance with claim 6 wherein said means for damping said transducer comprises air tight means for sealing one end of said movable element, said air tight means being adapted to trap air at said one end for providing a resistive film of air in said air space.

8. A transducer in accordance with claim 6 wherein said means for damping said transducer comprises sealing means for enclosing one end of said movable element to establish an air trap therein and tube means extending through said sealing means into said air trap for communicating the latter with the external atmosphere.

9. A transducer in accordance with claim 8 wherein the ratio of the tube length to the tube cross-sectional area provides a precision adjustment of the mechanical damping for said transducer.

10. A transducer for converting electrical energy into mechanical energy comprising a magnetic member, a movable element in sliding relation to said magnetic member, said movable element having a plurality of windings associated therewith adapted to be energized by electrical signals applied thereto, spacer means positioned intermediate said magnetic member and said movable element, mechanical damping means in operative relation with said transducer including means for sealing one end of said movable member for establishing an air trap therein, and tube means extending into said air trap for communicating the latter with the external atmosphere, and mechanical utilization means connected to said movable element and given translatory movement thereby in accordance with characteristics of said electrical signal.

11. A transducer for converting electrical energy into mechanical energy comprising a cylindrical magnetic member, a cylindrial movable element in sliding relation to said magnetic member, said movable element having a plurality of windings associated therewith adapted to be energized by electrical signals applied thereto, spacer means positioned intermediate said magnetic member and said movable element for establishing an annular air space therebetween, means for damping said transducer including sealing means at one end of said movable element adapted to trap air therein and thereby provide a resistive film of air in said annular air space, and mechanical utilization means connected to said movable element and given translatory movement thereby in accordance with characteristics of said electrical signal.

12. A transducer for converting electrical energy into mechanical energy comprising an electromagnetic vibrating member including a magnetic element and a coil bearing movable element in operative relation thereto, spacer means slidingly positioned intermediate said magnetic element and said movable element, said vibrating member being adapted for translatory motion in response to electrical signals applied to said coil, and mechanical pivot means associated with said vibrating member for producing a curvilinear movement in accordance with the translatory motion of said vibrating member.

13. A transducer for converting electrical energy into mechanical energy comprising an electromagnetic vibrating member including a cylindrical magnetic element and a cylindrical coil bearing element in operative relation thereto, a plurality of low friction spacer means positioned intermediate said magnetic element and said cylindrical coil bearing element, said coil bearing element being adapted for translatory motion in response to electrical signals applied to said coil, and mechanical pivot means associated with said vibrating member for producing a curvilinear movement in accordance with the translatory motion of said coil bearing element.

14. A transducer for converting electrical energy into mechanical energy comprising an electromagnetic vibrating member including a magnetic element and a coil bearing movable element in sliding relation thereto, spacer means disposed intermediate said magnetic element and said movable element for maintaining a given spacing therebetween, said vibrating member being adapted for translatory motion in response to electrical signals applied to said coil, and mechanical pivot means associated with said vibrating member for producing a curvilinear movement in accordance with the translatory motion of said vibrating member.

15. In a transducer for converting electrical energy into mechanical energy the combination comprising an electromagnetic vibrating member including a magnetic element and a coil bearing movable element in slidable relation thereto, spacer means slidingly positioned intermediate said magnetic element and said movable element, said vibrating member being adapted for translatory motion in response to electrical signals applied to said coil, mechanical pivot means associated with said vibrating member for producing a curvilinear movement in accordance with the translatory motion of said vibrating member, and means including a resilient member in operative relation to said mechanical pivot means for determining the amplitude of said curvilinear movement for a given intensity of electrical signal.

16. A transducer for converting electrical energy into mechanical energy comprising an electromagnetic vibrating member including a magnetic element and a coil bearing movable element in slidable relation thereto, spacer means disposed intermediate said magnetic element and said movable element for maintaining a given spacing therebetween, said vibrating member being adapted for translatory motion in response to electrical signals applied to said coil, mechanical pivot means associated with said vibrating member for producing a curvilinear movement in accordance with the translatory motion of said vibrating member, and means including a resilient member in operative relation to said mechanical pivot means for determining the amplitude of said curvilinear movement for a given intensity of electrical signal.

References Cited in the file of this patent

UNITED STATES PATENTS

| | | |
|---|---|---|
| 473,538 | Weston | Apr. 26, 1892 |
| 2,360,008 | Nelsen | Oct. 10, 1944 |
| 2,465,198 | Christiansen | Mar. 22, 1949 |
| 2,530,868 | Garceau | Nov. 21, 1950 |
| 2,556,816 | Lukacs | June 12, 1951 |
| 2,739,030 | Kruse | Mar. 20, 1956 |